(12) United States Patent
Lin et al.

(10) Patent No.: US 7,706,691 B2
(45) Date of Patent: Apr. 27, 2010

(54) TRANSMISSION DEVICE HAVING OPTICAL FIBERHIGH DEFINITION DIGITAL AUDIO-VIDEO DATA INTERFACE

(75) Inventors: Chih-Chuan Lin, Hsinchu County (TW); Tuan-Yu Hung, Hsinchu County (TW); Chang-You Li, Hsinchu County (TW)

(73) Assignee: Apac Opto Electronics Inc., Hsinchu County (TW)

( * ) Notice: Subject to any disclaimer, the term of this patent is extended or adjusted under 35 U.S.C. 154(b) by 739 days.

(21) Appl. No.: 11/544,861

(22) Filed: Oct. 10, 2006

(65) Prior Publication Data
US 2008/0008470 A1    Jan. 10, 2008

(30) Foreign Application Priority Data
Jul. 5, 2006    (TW) .............................. 95124522 A

(51) Int. Cl.
*H04B 10/24*    (2006.01)
*H04B 10/12*    (2006.01)

(52) U.S. Cl. ......................... 398/110; 398/41; 398/42; 398/106; 398/107; 398/113; 398/140; 398/141; 398/182; 398/192; 398/193

(58) Field of Classification Search ................... 398/41, 398/42, 106, 107, 113, 141, 110, 140, 182, 398/192, 193; 725/74, 143, 148, 149; 375/360, 375/361
See application file for complete search history.

(56) References Cited

U.S. PATENT DOCUMENTS

2006/0008276 A1*    1/2006    Sakai et al. .................. 398/141
2007/0233906 A1*    10/2007    Tatum et al. .................. 710/26

\* cited by examiner

*Primary Examiner*—Ken N Vanderpuye
*Assistant Examiner*—Daniel G Dobson
(74) *Attorney, Agent, or Firm*—Birch, Stewart, Kolasch & Birch, LLP

(57) ABSTRACT

A transmission device having optical fiber high definition digital audio-video data interface (HDMI/DVI/UDI), in which optical fiber is utilized as the physical connection for the logical channels of the transmission device, and is used to carry images, voices and auxiliary data of the logic channels. For the half-duplex transmission mode utilized by the display data channel, the reverse unit, the serial unit, and the multi-serial unit are properly arranged, thus fulfilling the DC balance requirement of optical fiber transmission, and resolving the lower tolerance rate shortcomings of the I2C bus specification of display data channel (DDC) and the customer electronics control (CEC) channel.

10 Claims, 4 Drawing Sheets

TRANSMISSION DEVICE HAVING OPTICAL FIBERHIGH DEFINITION DIGITAL AUDIO-VIDEO DATA INTERFACE

CROSS-REFERENCE TO RELATED APPLICATIONS

This non-provisional application claims priority under 35 U.S.C. § 119(a) on Patent Application No(s). 095124522 filed in Taiwan, R.O.C. on Jul. 5, 2006, the entire contents of which are hereby incorporated by reference.

BACKGROUND OF THE INVENTION

1. Field of Invention

The present invention relates to a high definition digital audio-video data interface, and in particular, to a high definition digital audio-video data transmission device utilizing optical fiber as the transmission medium.

2. Related Art

In general, the high definition digital audio-video data interface includes a High Definition Multimedia Interface (HDMI), a Digital Visual Interface (DVI), and a forthcoming Unified Display Interface (UDI). Among them, the High Definition Multimedia Interface (HDMI) is utilized to integrate and standardize the transmission specification of the signals coming from the audio and video sources, so that in the design of a high definition digital audio-video system, the DVI is used as a basis in providing wider transmission bandwidth and a much more miniaturized connector. As such, only one single cable is required to transmit the uncompressed audio signal and high definition video signal, thus simplifying the installation of the audio-video system, and further raising the audio and video signals transmission quality. In this respect, the UDI is used as a PC digital display interface standard in compatible with the standard of HDTV signals. It is now replacing the gradually out-dated and phasing-out Video Graphic Array (VGA) analog standard, and thus in compatible with the DVI and the HDMI.

In this respect, the HDMI is taken as an example. To improve the performance of the transmission specification, a Transmission Minimized Differential Signaling (TMDS) coding is utilized by the HDMI. In general, TMDS is provided with a color data of three original colors (RGB)/intensity aberration (YPbPr) and a serial transmission loop of four channels (a connection) including a clock pulse channel. The respective channel utilizes the low amplitude differential transmission having 50 Ω terminal impedance and 0.15V voltage difference. The maximum transmission speed of the respective channel is 1.65 Gbps, thus ensuring the connection having transmission speed of 5 Gbps.

In addition, the HDMI is further provided with a support for the High Bandwidth Digital Content Protection (HDCP) mechanism, which is a kind of agreement reached and agreed upon jointly by the movie and program producers and the TV program transmission provider for protecting the intellectual property rights of the movie and TV programs, hereby preventing the illegal duplication of digital signal and image data. Meanwhile, the HDMI is used to provide better Display Data Channel (DDC) that is utilized to read the Extended Display Identification Data (EDID) indicating the displaying capability such as the resolution of the reception device. As such, password verification is performed between the transmission and reception device of the HDCP mechanism for the signals by making use of DDC, so that the transmission device and the reception device may verify each other at a predetermined time interval. In case that the verification fails, then the audio-video signals transmission is terminated immediately to protect the contents of the signals. In the signal transmission making used of HDMI, the transmission of Consumer Electronics Control (CEC) may optionally be utilized. Presently, in Europe, the audio-video equipment of communication habitually utilizes a cross-system remote-control transmission protocol called AV.Link, and in this connection, HDMI may be utilized in support of this standard protocol, thus achieving the control of a plurality of audio-video devices through a single remote controller.

For a more detailed description of the above-mentioned system, refer to FIG. 1. FIG. 1 is a schematic diagram of a framework of a transmission/reception system having a HDMI according to the prior art. As shown in FIG. 1, the transmission/reception system includes a transmission device 10 and a reception device 11 both having HDMI, with the former having a transmission unit 101, and the latter having a reception unit 111. In the transmission device 10 having HDMI, the audio-video data 601 to 603 are transmitted to the reception device 11 having HDMI through the transmission unit 101, and is received by the reception unit 111. The logic channels carrying these data are the first data channel 901, the second data channel 902, and the third data channel 903. In addition, a clock pulse channel 904 is responsible for transmitting a video pixel clock 604 to the reception unit 111, the frequency of which is utilized as a reference frequency for the return data. The above-mentioned four logic channels are operated in a simplex transmission mode, namely, they are used to carry only the data transmitted from the transmission unit 101, and received by the reception unit 111.

Moreover, the system is further provided with a DDC 905 and a Consumer Electronics Control (CEC) channel 906, that are used to read the Extended Display Identification Data (EDID) indicating the display capability such as the resolution of the reception device 11. In general, the DDC 905 is a logic channel, with its transmission specification in compatible with that of I2C Bus, and is usually utilized as a system management bus, including a Serial Data Line (SDA) and a Serial Clock Line (SCL), and are used to transmit the identification data of the reception device 11 and the reference clock pulses between the devices. Usually, the DDC 905 is operated in a half-duplex transmission mode, namely, both the transmission device 10 and the reception device 11 having HDMI may proceed with data transmission in both directions. However, at any one particular time interval, data may only be transmitted from the device on one side and received by the device on the other side.

In the conventional transmission/reception system having HDMI, the above-mentioned channels are realized by copper wires to achieve physical connection. However, for the application of this kind of copper wire, the major drawback is that it is susceptible to electromagnetic interference, mainly due to the limited bandwidth of the copper wire, and this kind of drawback constitutes an obstacle in the development of wider bandwidth transmission interface. Furthermore, usually, the signals transmitted in the copper wire are susceptible to power loss, so that the length of the transmission wire used for high definition multimedia interface may only reach 15 m at most. In the invention, optical fiber is used to replace copper wire to achieve physical connection in the framework of conventional transmission/reception system having HDMI, DVI, and UDI, thus overcoming and improving the shortcomings of the prior art utilizing copper wire.

SUMMARY OF THE INVENTION

In order to overcome the problems and shortcomings of the prior art, the present invention discloses a transmission device having optical fiber high definition digital audio-video data interface (including HDMI/DVI/UDI), wherein optical fiber is used to replace the conventional copper wire, thus serving as a transmission medium of a high definition digital audio-video data interface, by making use of its characteristics of no electromagnetic interference, high transmission speed, and low transmission power loss.

In the transmission and reception device having optical fiber high definition digital audio-video data interface as disclosed by the present invention, optical fiber is utilized as the physical connection wire for the logic channels of the high definition digital audio-video data interface. Wherein, the logic channels include a first data channel, a second data channel, a third data channel, a clock pulse channel, a display data channel, and a customer electronics control channel. In the present invention, more than one logic channels are arranged into at least an optical fiber, so that the data of the display data channel and the customer electronics control channel are optical-coupled to other logic channels. Moreover, for the half-duplex transmission mode utilized by the display data channel, a reverse unit, a serial unit, and a multi-serial unit are properly arranged, thus fulfilling the DC balance requirement of optical fiber transmission, and resolving the lower tolerance rate shortcomings of the I2C bus specification of DDC and the CEC channel.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow for illustration only, and thus is not limitative of the invention, and wherein.

DETAILED DESCRIPTION OF THE INVENTION

The purpose, construction, features, and functions of the invention can be appreciated and understood more thoroughly through the following detailed description with reference to the attached drawings.

Figure 1:
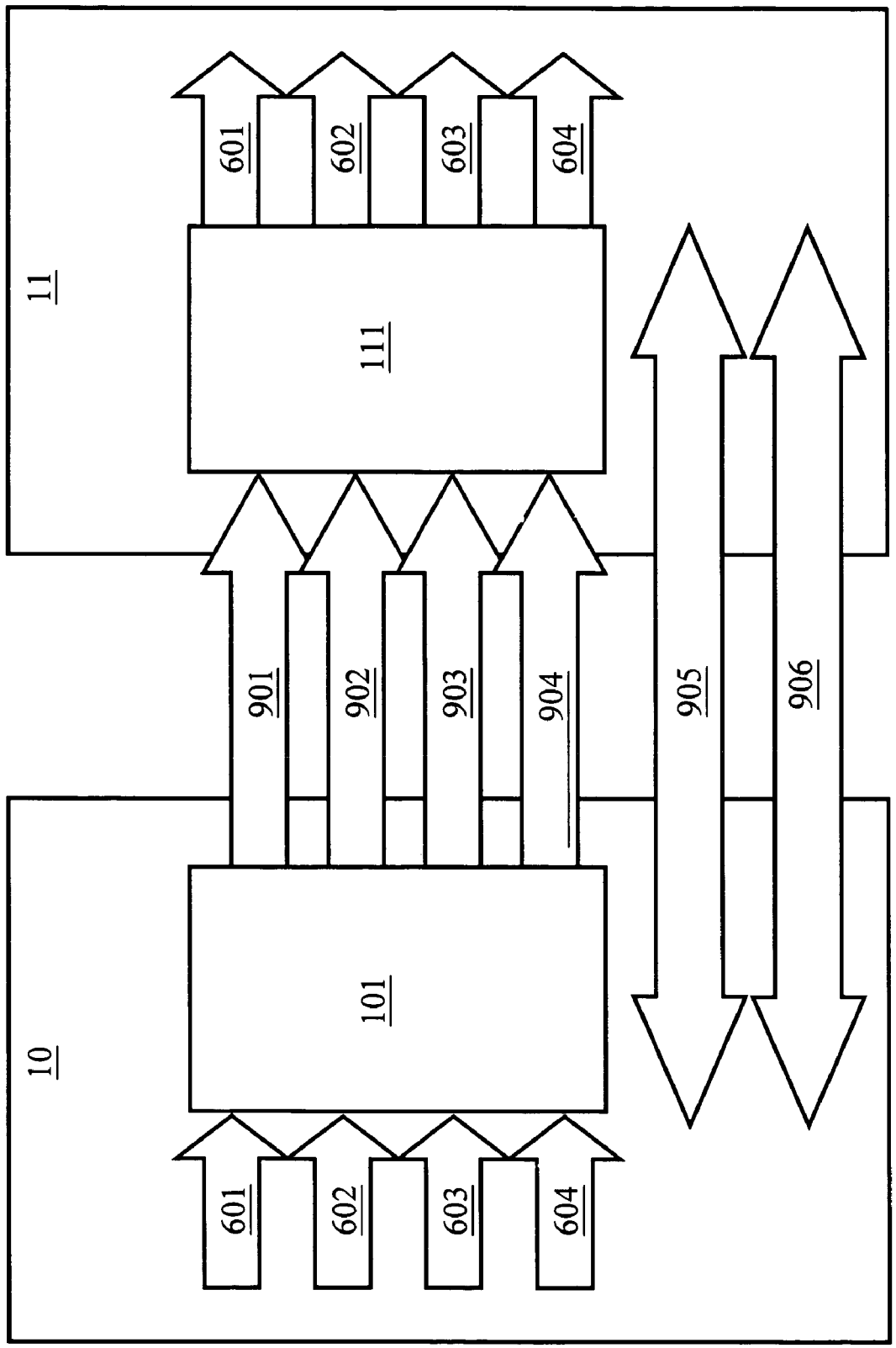
FIG. 1 is a schematic diagram of a framework of a transmission/reception system having High Definition Multimedia Interface (HDMI) according to the prior art.
Figure 2:
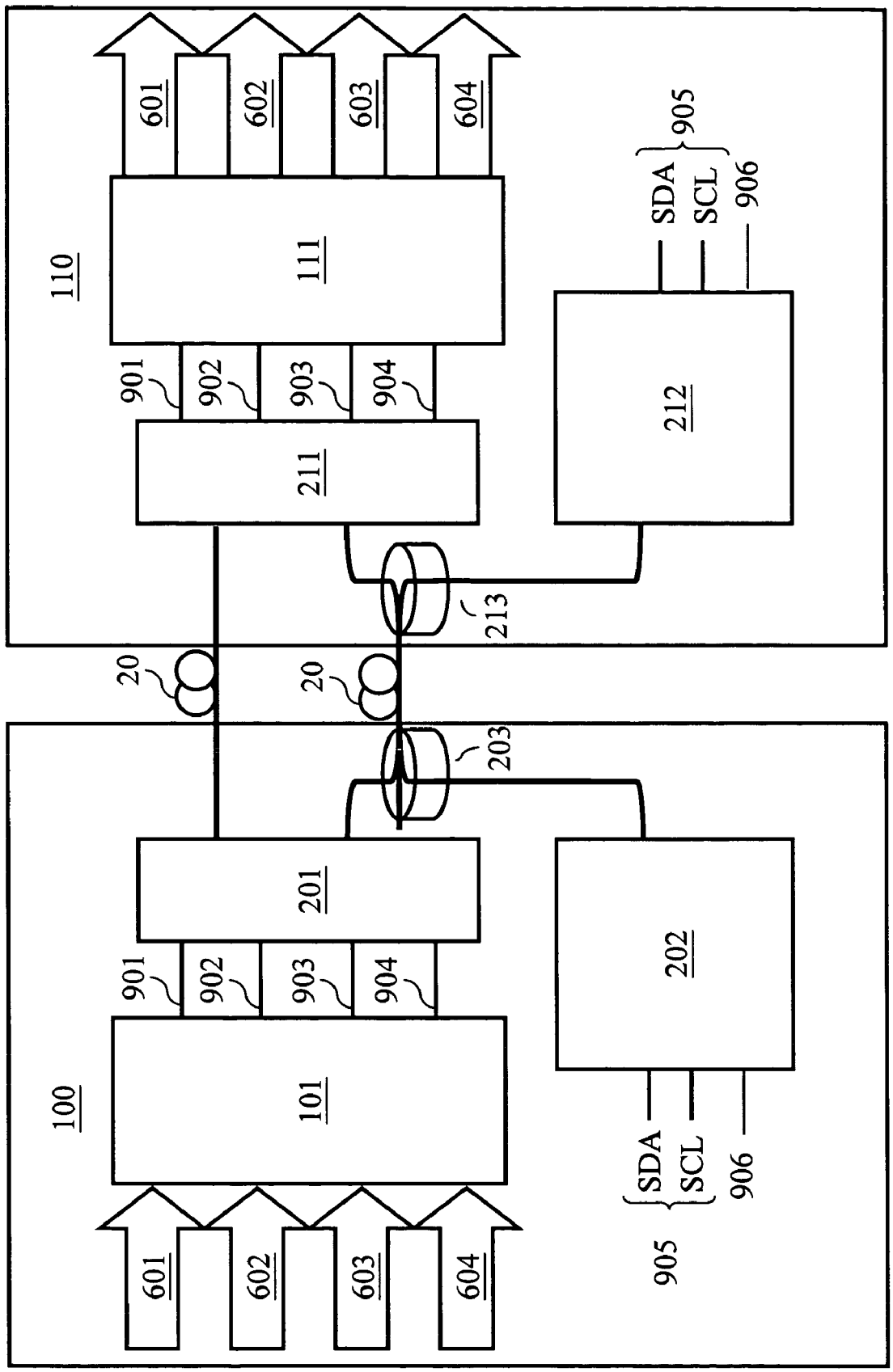
FIG. 2 is a schematic diagram of a framework for a transmission/reception system having optical fiber high definition digital audio-video data interface according an embodiment of the invention.

As shown in FIG. 2, it is a schematic diagram of a framework for a transmission/reception system having optical fiber high definition digital audio-video data interface (including HDMI/DVI/UDI) according an embodiment of the present invention. As shown in FIG. 2, the transmission/reception system includes a first transmission device 100 having high definition digital audio-video data interface, and a second transmission device 110 having high definition digital audio-video data interface, with the former having a transmission unit 101, and the latter having a reception unit 111. Wherein, a light emitting unit 201 and a light reception unit 211 are also provided. The light emitting unit 201 is arranged in the first transmission device 100 having high definition digital audio-video data interface, and is used to transmit data on the logic channels of a first data channel 901, a second data channel 902, a third data channel 903, and a clock pulse channel 904, in a form of light to a second transmission device 110 having high definition digital audio-video data interface through optical fiber 20. Wherein, the light reception unit 211 is used to receive these data. In such a structure, the light emitting unit 201 is connected to the light reception unit 211 through the optical fiber 20, hereby realizing data transmission.

In a real embodiment of the present invention, the light emitting unit 201 is composed of a plurality of Transmitter Optical Sub-Assembly (TOSA), with one logic channel corresponding to a TOSA; or, alternatively, it is composed of a plurality of Dual Transmitter Optical Sub-Assembly (DTOSA), with two logic channels corresponding to a DTOSA. Furthermore, the wavelengths of the two lights emitted by the a DTOSA are different, that may be selected from any two of the following: 650 nm, 855 nm, 1310 nm, and 1550 nm etc., so that the light signals converted from signals on different logic channels can be transmitted on an optical fiber without interfering each other.

Figure 3B:
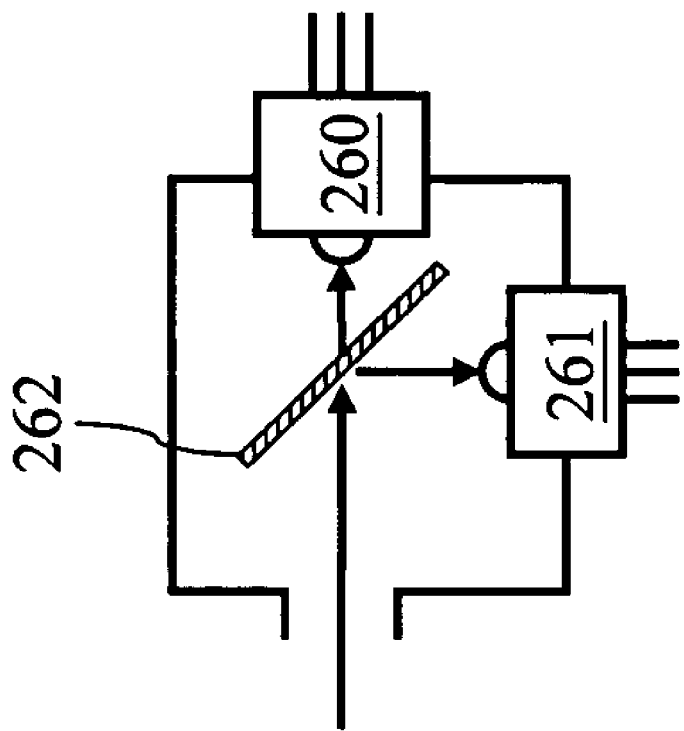
FIG. 3B is a schematic diagram of the structure of a dual transmitter optical sub-assembly according to another embodiment of the invention.
Figure 3A:
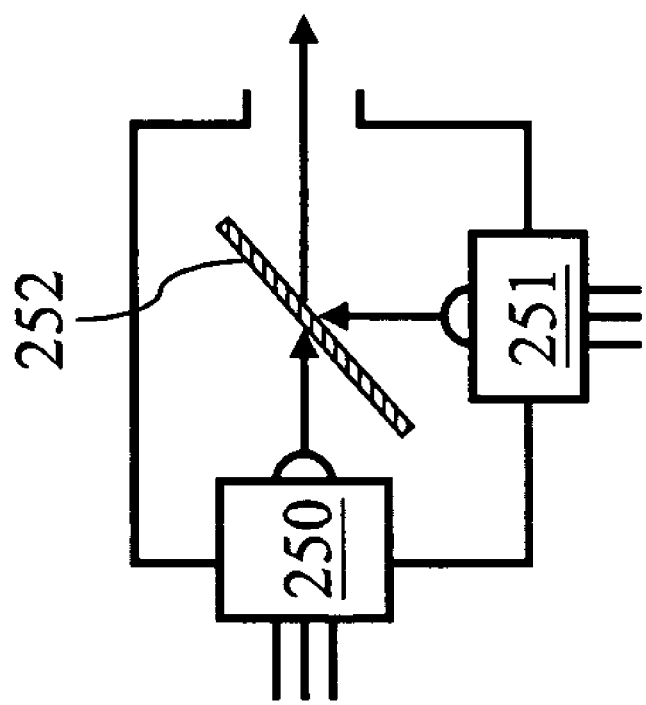
FIG. 3A is a schematic diagram of the structure of a dual transmitter optical sub-assembly according to one embodiment of the invention.

Next, refer to FIG. 3A for a schematic diagram of the structure of the DTOSA according to an embodiment of the present invention. As shown in FIG. 3A, the DTOSA according to an embodiment of the present invention is composed of: two light emitters 250, 251, and a light filter 252. Wherein, the wavelengths of the lights emitted by the two light emitters 250 and 251 are 1310 nm and 1550 nm respectively, which are taken as an example for explanation purpose. In this respect, the light emitter can be a laser or light-emitting-diode (LED). The film coated on the surface of light filter 252 is used to allow the passage of light of wavelength 1310 nm, however, reflect the light of wavelength 1550 nm. As such, when the two light emitters 250,251 emit lights, the signals carried by the light can be transmitted synchronously into the optical fiber 20, thus achieving the purpose of the real embodiment of converting the signals on the logic channel into light signals. Alternatively, another way of achieving a real embodiment is to make a transmitter optical sub-assembly (TOSA) correspond to a logic channel, then convert the signals on the respective logic channels into light signals, and finally couple the light signals into an optical fiber by making use of an optical coupler/splitter. Naturally, the light signals transmitted in the same optical fiber can be of different wavelengths.

Furthermore, the light reception unit 211 can be composed of a plurality of Receiver Optical Sub-Assembly (ROSA), with a logic channel corresponding to a ROSA. Or, alternatively, the light reception unit 211 can be composed of a plurality of Dual Receiver Optical Sub-Assembly (DROSA), with two logic channels corresponding to a DROSA. As shown in FIG. 3B, the DROSA is composed of two light receivers 260, 261 and a light filter 262. Its principle of operation is the same as that of the DTOSA, thus it will not be repeated here for brevity.

Moreover, in the above description, the data on the various logic channels are transmitted/received in a Wavelength Division Multiplexing (WDM) manner, or Dense Wavelength Division Multiplexing (DWDM) manner. The optical fiber 20 utilized can be the Single-Mode Fiber (SMF) of wavelength 1310 nm or 1550 nm, or the Multi-Mode Fiber (MMF) of wavelength 850 nm or 1300 nm.

In the real embodiment of the present invention, the data on a display data channel 905 and on a consumer electronics control channel 906 can be physically linked through a conventional copper wire or an optical fiber. As shown in FIG. 2, in a first transmission device 100 having high definition digital audio-video data interface, a transmission module 202 of the first display data channel is utilized to transmit the data of a display data channel 905 and a consumer electronics control 906 in a form of light signals through an optical fiber 20, and a first light coupler/splitter unit 203 is used to optical-couple data of the light emitting unit 201 and data of the transmission module 202 of the first display data channel, and then the optical-coupled data are transmitted to the second transmission device 110 having high definition digital audio-video data interface.

In the second transmission device 110 having high definition digital audio-video data interface, a second light coupler/splitter unit 213 is used to receive the data transmitted to the light reception unit 211 and a transmission module 212 of the second display data channel.

In addition, the transmission module 212 of the second display data channel is utilized to receive in an optical manner the data of a display data channel 905 and a consumer electronics control channel 906 through the optical fiber 20. In the process of data transmission, all the logic channels except the display data channel 905 are operated in a simplex transmission mode. As such, only the transmission module 212 of the second display data channel is utilized to transmit the data of a display data channel 905 through the optical fiber 20 to the first transmission device 100 having high definition digital audio-video data interface by making use of the second light coupler/splitter unit 213.

In the first transmission device 100 having high definition digital audio-video data interface, the first light coupler/splitter unit 203 is used to receive the data transmitted to the transmission module 202 of the first display data channel from the transmission module 212 of the second display data channel.

Subsequently, refer to FIGS. 4A and 4B for a schematic diagram of the framework of the transmission module 202 of the first display data channel according to an embodiment of the present invention, and a schematic diagram of the framework of the transmission module 212 of the second display data channel according to an embodiment of the present invention respectively.

Figures 4A, 4B:
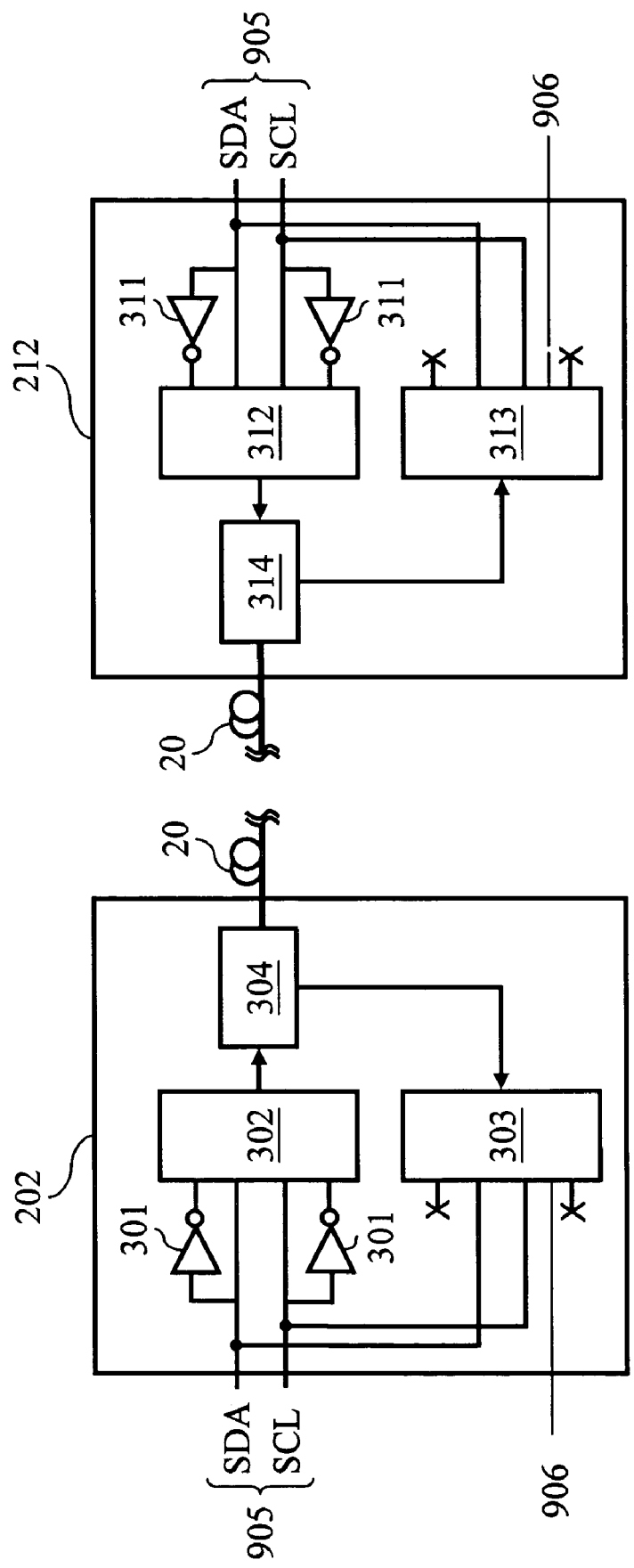
FIG. 4A is a schematic diagram of the framework of the transmission module of the first display data channel according to one embodiment of the invention.
FIG. 4B is a schematic diagram of the framework of the transmission module of the second display data channel according to another embodiment of the invention.

As shown in FIG. 4A, in the transmission module 202 of the first display data channel, the data on Serial Data Line (SDA) and Serial Clock Line (SCL) of the display data channel 905 and on Customer Electronics Control (CEC) channel 906 are reverse processed into the first reverse data by making use of a first reverse unit 301, namely, the binary bits "1" and "0" are exchanged with each other, then the reversed data are input into the first serial unit 302 together with the un-reversed first un-reversed data, so that in the same data, there exist the un-reversed bits and the corresponding reversed bits, as such the numbers of bits "0" and "1" are the same in the data contents, thus in compatible with the requirement of DC balance in optical fiber data transmission. Therefore, in decoding the received data in a second transmission device 110 having high definition digital audio-video data interface, the received data can be read and correctly obtained by fetching only the reversed data or the un-reversed data. In the real embodiment of the present invention, for the proper operations of the SDA, SCL and CEC channel 906, a plurality of fist reverse units 301 are utilized.

Next, the first serial unit 302 is used to process the input first reverse data and the first un-reversed data into the first serial data and output them to the first light transmission/reception unit 304. Then, the first light transmission/reception unit 304 is used to transmit and output the input first serial data in a form of light to the first optical coupler/splitter 203 for coupling the light emitting unit 201.

Subsequently, the first serial unit 302 receives the data input from the first optical coupler/splitter 203, and outputs the received data to a first de-serialized unit 303. The first de-serialized unit 303 is then utilized to perform de-serialization processing of the data on the display data channel 905 and the customer electronics control channel 906 received from the second transmission device 110 having high definition digital audio-video data interface, thus obtaining the SDA and SCL of the display data channel 905 and on CEC channel 906 respectively.

In addition, as shown in FIG. 4B, in the transmission module 212 of the second display data channel, the data on SDA and SCL of the display data channel 905 and on CEC channel 906 are reverse processed into the second reverse data by making use of a second reverse unit 311, then the reversed data are input into the second serial unit 312 together with the un-reversed second un-reversed data. In the real embodiment of the present invention, for the proper operations of the SDA, SCL and CEC channel 906, a plurality of second reverse units 311 are utilized.

Moreover, the second serial unit 312 is used to process the input second reverse data and the second un-reversed data into a second serial data and output them to the second light transmission/reception unit 314. Then, the second light transmission/reception unit 314 is used to transmit and output the input second serial data in a form of light to the second optical coupler/splitter 213.

Finally, the second serial unit 312 may receive the data input from the second optical coupler/splitter 213, and outputs the received data to a second de-serialized unit 313. The second de-serialized unit 313 is then utilized to perform de-serialization processing of the data on the display data channel 905 and the customer electronics control channel 906 received from the first transmission device 100 having high definition digital audio-video data interface, thus obtaining the data on SDA and SCL of the display data channel 905 and on CEC channel 906.

In the real embodiment of the present invention, the first light transmission/reception unit 304, and the second light transmission/reception unit 314 are bi-directional optical sub-assemblies (BOSA) respectively.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission device having optical fiber high definition digital audio-video data interface (HDMI/DVI/UDI) for transmitting the data of a plurality of logic channels of high definition digital audio-video data interface, and transmitting and receiving the data of a display data channel and of a customer electronics control channel of high definition digital audio-video data interface through at least an optical fiber, the transmission device having optical fiber high definition digital audio-video data interface comprising:

a light transmission unit for converting the data of the plurality of logic channels into light signals, and transmit them into the optical fiber for transmission; and a first display data channel transmission module for DC-balancing the data of the display data channel and the customer electronics control channel, serializing the data and convert them into light signals, and then transmitting them into the optical fiber for transmission, converting the received light signals into electric signals, de-serializing, de-DC-balancing, and then transmitting them to the display data channel and the customer electronics control channel, wherein the first display data channel transmission module comprises:

a plurality of first reverse units for reversing the data of the display data channel and the customer electronics control channel into a first reverse data;

a first serial unit for serializing and outputting the first reverse data, a first un-reversed data of the display data channel and the customer electronics control channel as a first serial data;

a first light transmission/reception unit for transmitting the first serial data and receiving a second serial data; and a first de-serial unit for de-serializing the second serial data.

2. The transmission device having optical fiber high definition digital audio-video data interface as claimed in claim 1, wherein the light transmission unit includes a plurality of transmitter optical sub-assemblies (TOSA).

3. The transmission device having optical fiber high definition digital audio-video data interface as claimed in claim 1, wherein the light transmission unit includes a plurality of dual transmitter optical sub-assemblies (DTOSA).

4. The transmission device having optical fiber high definition digital audio-video data interface as claimed in claim 1, wherein the first light transmission/reception unit is a Bi-directional Optical Sub-Assembly (BOSA).

5. The transmission device having optical fiber high definition digital audio-video data interface as claimed in claim 1, further comprising:

a first optical coupler/splitter for coupling the data transmitted respectively from the light transmission unit and the first light transmission/reception unit, and then transmitting them through one of said optical fibers, wherein the first optical coupler/splitter is further utilized to output the received data to the first light transmission/reception unit.

6. A transmission device having optical fiber high definition digital audio-video data interface (HDMI/DVI/UDI) for receiving data of a plurality of logic channels of optical fiber high definition digital audio-video data interface, and transmitting and receiving the data of a display data channel and of a customer electronics control channel of high definition digital audio-video data interface through at least an optical fiber as claimed in claim 1, the transmission device having optical fiber high definition digital audio-video data interface comprising:

a light reception unit for converting the received light signals of the plurality of logic channels into electric signals, and then transmitting them into the plurality of logic channels; and a second display data channel transmission module for DC-balancing the data of the display data channel and the customer electronics control channel, serializing the data and converting them into light signals, and then transmitting them into said optical fiber for transmission, converting the received light signals into electric signals, de-serializing, de-DC-balancing, and then transmitting them to the display data channel and the customer electronics control channel, wherein the second display data channel transmission module comprises:

a plurality of second reverse units for reversing the data of said display data channel and the customer electronics control channel into a second reverse data;

a second serial unit for serializing and outputting the second reverse data, a second un-reversed data of the display data channel and the customer electronics control channel as the second serial data;

a second light transmission/reception unit transmitting the second serial data and receiving the first serial data; and a second de-serial unit for de-serializing the first serial data.

7. The transmission device having optical fiber high definition digital audio-video data interface as claimed in claim 6, wherein the light reception unit includes a plurality of Receiver Optical Sub-Assemblies (ROSA).

8. The transmission device having optical fiber high definition digital audio-video data interface as claimed in claim 6, wherein the light reception unit includes a plurality of dual receiver optical sub-assemblies (DROSA).

9. The transmission device having optical fiber high definition digital audio-video data interface as claimed in claim 6, wherein the second light transmission/reception unit is a Bi-directional Optical Sub-Assembly (BOSA).

10. The transmission device having optical fiber high definition digital audio-video data interface as claimed in claim 6, further comprising:

a second optical coupler/splitter for outputting the data transmitted from the second light transmission/reception unit, and then transmitting them through one of said optical fibers, wherein the second optical coupler/splitter is further utilized to output the received data to the light reception unit and the second light transmission/reception unit.

* * * * *